(12) United States Patent
Faundez Hoffmann et al.

(10) Patent No.: US 11,770,670 B2
(45) Date of Patent: Sep. 26, 2023

(54) GENERATING SPATIAL AUDIO AND CROSS-TALK CANCELLATION FOR HIGH-FREQUENCY GLASSES PLAYBACK AND LOW-FREQUENCY EXTERNAL PLAYBACK

(71) Applicant: Meta Platforms Technologies, LLC, Menlo Park, CA (US)

(72) Inventors: Pablo Francisco Faundez Hoffmann, Kenmore, WA (US); Tetsuro Oishi, Bothell, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/575,452

(22) Filed: Jan. 13, 2022

(65) Prior Publication Data
US 2023/0224663 A1    Jul. 13, 2023

(51) Int. Cl.
*H04R 5/02* (2006.01)
*H04S 7/00* (2006.01)
*H04R 3/04* (2006.01)
*G02B 27/01* (2006.01)
*H04R 5/04* (2006.01)

(52) U.S. Cl.
CPC ............ *H04S 7/303* (2013.01); *G02B 27/017* (2013.01); *H04R 3/04* (2013.01); *H04R 5/04* (2013.01); *H04S 2420/01* (2013.01)

(58) Field of Classification Search
CPC ... H04S 7/303; H04S 2420/01; G02B 27/017; H04R 3/04; H04R 5/04
USPC ........................................ 381/74, 300, 303
See application file for complete search history.

(56) References Cited

U.S. PATENT DOCUMENTS

| | | | | |
|---|---|---|---|---|
| 2013/0051585 A1* | 2/2013 | Karkkainen | ......... | H04R 1/1075 381/151 |
| 2017/0094440 A1* | 3/2017 | Brown | ...................... | H04S 7/30 |
| 2020/0029141 A1* | 1/2020 | Yoneda | .................. | G06F 1/1679 |

(Continued)

OTHER PUBLICATIONS

Co-pending U.S. Appl. No. 63/046,947, filed Jul. 1, 2020, entitled Generating Synchronized Audio Playback for Speaker Systems Integrated With Glasses Devices, 28 pages.

(Continued)

*Primary Examiner* — Ammar T Hamid
(74) *Attorney, Agent, or Firm* — Keller Preece PLLC

(57) ABSTRACT

The present disclosure relates to systems, methods, and non-transitory computer-readable media that present spatial audio using the speakers of a wearable audio device and speakers external to the wearable audio device. In particular, in one or more embodiments, the disclosed systems generate spatial audio having a high-frequency component and a low-frequency component. The disclosed systems further generate cross-talk cancellation filters for the low-frequency component of the spatial audio. The disclosed systems can provide the high-frequency component for presentation via speakers of the wearable audio device and the low-frequency component for presentation via the external speakers using the cross-talk cancellation filters. In some cases, the disclosed systems generate the spatial audio or the cross-talk cancellation filters using a personalized interaural display model and/or head-related transfer functions.

20 Claims, 8 Drawing Sheets

(56) References Cited

U.S. PATENT DOCUMENTS

2022/0322024 A1* 10/2022 Subramanian .......... H04S 7/304

OTHER PUBLICATIONS

Freeland F.P., et al., "Efficient HRTF Interpolation in 3D Moving Sound," 22nd International AES Conference, 2002, 10 pages.
Kirkeby O., et al., "Design of Cross-Talk Cancellation Networks by Using Fast Deconvolution," Audio Engineering Society, 1999, 13 pages.
Majdak P., et al., "Sound Localization in Individualized and Non-Individualized Crosstalk Cancellation Systems," The Journal of the Acoustical Society of America, Apr. 2013, vol. 133, No. 4, pp. 2055-2068.
Srivastava A., et al., "Spatial HRTF Interpolation Using Spectral Phase Constraints," IEEE, International Conference on Signal Processing and Communications, 2020, 5 pages.

* cited by examiner

GENERATING SPATIAL AUDIO AND CROSS-TALK CANCELLATION FOR HIGH-FREQUENCY GLASSES PLAYBACK AND LOW-FREQUENCY EXTERNAL PLAYBACK

BACKGROUND

Recent years have seen significant advancement in hardware and software platforms for digital audio playback. For example, some conventional systems provide spatial audio playback that portrays sound within a three-dimensional environment. In particular, conventional systems may implement playback techniques to provide spatial cues that virtually position sounds around the listener (e.g., without using a speaker located at or near that position, such as may be used in surround sound systems). In other words, such systems can manipulate how sounds are received by the listener to provide a three-dimensional audio presentation.

Despite these advances, however, conventional spatial audio playback systems suffer from several technological shortcomings that result in inaccurate and inflexible operation. For example, conventional systems often fail to accurately provide spatial audio playback via audio devices having small form factors, such as wearable audio devices (e.g., glasses devices with integrated speakers). To illustrate, low frequency sound typically plays an important role in providing the spatial cues that virtually position sounds within the three-dimensional environment of the listener. Wearable audio devices, however, typically cannot integrate speakers that are powerful enough to effectively reproduce low frequency audio due to their relatively small form factor. Accordingly, conventional systems often cannot provide accurate spatial cues via wearable audio devices.

In addition to accuracy concerns, conventional spatial audio playback systems are also often inflexible. Indeed, because conventional systems fail to accurately provide spatial cues via wearable audio devices, these systems tend to exclude provision of spatial audio via wearable audio devices altogether. Conventional systems are often restricted in the contexts in which spatial audio may be presented as a result. Additionally, many conventional systems rely on the concept of interaural time difference to provide spatial cues, but rigidly utilize a standardized interaural time difference model for the provision of spatial audio for different users.

These, along with additional problems and issues, exist with regard to conventional spatial audio playback systems.

SUMMARY

One or more embodiments described herein provide benefits and/or solve one or more of the foregoing or other problems in the art with systems, methods, and non-transitory computer-readable media that utilize speakers external to a wearable audio device to flexibly supplement spatial audio output provided by the wearable audio device. To illustrate, in one or more embodiments, the disclosed systems generate spatial audio for presentation to a user of a wearable audio device. The disclosed systems can further determine low-frequency cross-talk cancellation filters for the spatial audio. The disclosed system can provide the high frequencies of the spatial audio for presentation via speakers of the wearable audio device and the low frequencies of the spatial audio for presentation via external speakers using the cross-talk cancellation filters. In this manner, the disclosed systems can accurately provide spatial cues while flexibly implementing the wearable audio device into spatial audio playback.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
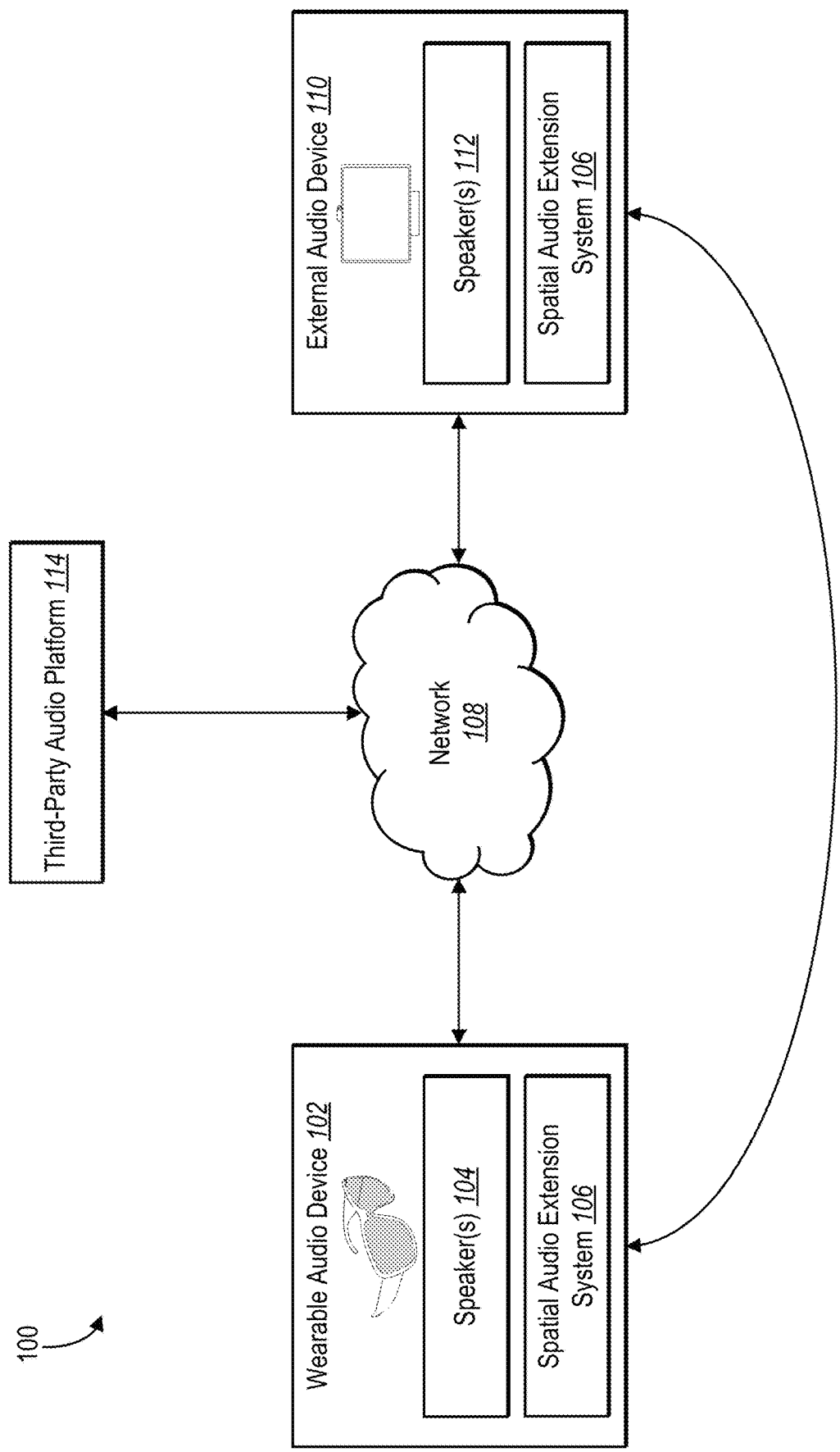
FIG. 1 illustrates an example environment in which a spatial audio extension system operates in accordance with one or more embodiments.

One or more embodiments described herein include a spatial audio extension system that flexibly extends the spatial audio presented for a user of a wearable audio device using external speakers for accurate, low-frequency spatial audio playback. For example, in one or more embodiments, the spatial audio extension system determines how the user of the wearable audio device receives audio signals, such as by determining head-related transfer functions and/or an interaural time difference for the user. The spatial audio extension system can utilize the head-related transfer functions and/or the interaural time difference to generate spatial audio for the user. In some cases, the spatial audio extension system further generates cross-talk cancellation filters for the low frequencies of the spatial audio. The spatial audio extension system can utilize external speakers to present the low frequencies of the spatial audio (e.g., using the cross-talk cancellation filters) while the wearable audio device presents the high frequencies.

To provide an illustration, in one or more embodiments, the spatial audio extension system determines one or more aural characteristics associated with a user of a wearable audio device. Using the one or more aural characteristics, the spatial audio extension system generates a pair of head-related transfer functions for the user of the wearable audio device. Further, the spatial audio extension system generates spatial audio using the pair of head-related transfer functions. In particular, the spatial audio includes a high-frequency audio component having audio that meets or exceeds a frequency threshold and a low-frequency audio component having audio that is below the frequency threshold. The spatial audio extension system provides the high-frequency audio component of the spatial audio for presentation via speakers of the wearable audio device and the low-frequency audio component of the spatial audio for presentation via speakers external to the wearable audio device.

As mentioned above, in one or more embodiments, the spatial audio extension system determines head-related transfer functions for a user of a wearable audio device. To illustrate, in some cases, the spatial audio extension system determines one or more characteristics of the user of the wearable audio device that affect how the user receives and/or interprets audio signals, such as the diameter of the user's head or the distance between the user's ears. Accordingly, the spatial audio extension system can determine the head-related transfer functions for the user based on the determined characteristic(s).

Further, in one or more embodiments, the spatial audio extension system determines an interaural time difference model for the user of the wearable audio device. In particular, in some cases, the spatial audio extension system determines a personalized interaural time delay model for the user. For instance, the spatial audio extension system can determine the interaural time delay model based on how audio signals are received by microphones on either side of the wearable audio device (e.g., at the mid-temple or rear temple) when worn by the user.

As further, mentioned, in one or more embodiments, the spatial audio extension system generates spatial audio for presentation to the user of the wearable audio device. In some cases, the spatial audio extension system utilizes the head-related transfer functions determined for the user to generate the spatial audio. In some cases, the spatial audio extension system utilizes the interaural time difference determined for the user to generate the spatial audio.

In some cases, the spatial audio extension system generates cross-talk cancellation filters for the spatial audio. In particular, the spatial audio extension system generates cross-talk cancellation filters for the portion of the spatial audio that is below a frequency threshold. In some implementations, the spatial audio extension system utilizes the head-related transfer functions and/or the interaural time difference model determined for the user of the wearable audio device to generate the cross-talk cancellation filters.

Additionally, as mentioned, in some embodiments, the spatial audio extension system provides the spatial audio for presentation to the user of the wearable audio device. In particular, the spatial audio extension system provides the content of the spatial audio associated with higher frequencies (e.g., frequencies meeting or exceeding the frequency threshold) for presentation via the speakers of the wearable audio device. Further, the spatial audio presentation system provides the content of the spatial audio associated with lower frequencies (e.g., frequencies below the frequency threshold) for presentation via speakers that are external to the wearable audio device (e.g., speakers integrated into an external audio device). In some cases, the spatial audio extension system utilizes the cross-talk cancellation filters to process the spatial audio content associated with the lower frequencies before presentation via the external speakers.

In some implementations, the spatial audio extension system adds a time delay to the audio content presented via the speakers of the wearable audio device. Thus, the spatial audio extension system can time-align the audio presented via the wearable audio device and the audio presented via the external speakers.

The spatial audio extension system provides several advantages over conventional systems. For example, by leveraging speakers that are external to a wearable audio device for low-frequency audio playback, the spatial audio extension system provides more accurate spatial cues in its audio presentation. Indeed, the spatial audio extension system can use external speakers that are much larger than those integrated into the wearable audio device, and thus more capable of reproducing low-frequency sounds with sufficient power for effective spatial cues. Accordingly, the spatial audio extension system can provide a more accurate spatial audio presentation for wearable audio device users.

Further, the spatial audio extension system operates more flexibly than conventional systems. Indeed, by leveraging external speakers for low-frequency audio playback, the spatial audio extension system flexibly facilitates incorporation of wearable audio devices into spatial audio presentations. Thus, the spatial audio extension system facilitates improved incorporation of spatial audio in contexts that are uniquely suited for wearable audio devices (e.g., where the wearable audio device provides an augmented/virtual reality environment experience to the user). Additionally, by determining a personalized interaural time difference model for the user of the wearable audio device, the spatial audio extension system flexibly provides spatial audio that is personalized to the user.

As illustrated by the foregoing discussion, the present disclosure utilizes a variety of terms to describe features and benefits of the spatial audio extension system. Additional detail is now provided regarding the meaning of these terms. For example, as used herein, the term "spatial audio" refers to digital audio. In particular, spatial audio can refer to digital audio designed to virtually position sound at one or more target locations within a three-dimensional environment of a listener. For example, spatial audio can include digital audio that includes one or more sound cues that indicate a virtual position of a corresponding sound within the three-dimensional environment of the listener.

In one or more embodiments, spatial audio includes a high-frequency component and a low-frequency component. As used herein, the term "high-frequency audio component" refers to (a portion of) spatial audio that is associated with one or more frequencies that meet or exceed a frequency threshold. In some cases, a high-frequency component includes (a portion of) spatial audio associated with mid-to-high frequencies. On the other hand, as used herein, the term "low-frequency audio component" refers to (a portion of) spatial audio that is associated with one or more frequencies that fall below a frequency threshold. As an illustration, in some cases, 1500 Hz is used as the frequency threshold. Thus, a high-frequency audio component includes audio at or above 1500 Hz while a corresponding low-frequency audio component includes audio that falls below 1500 Hz.

As used herein, the term "aural characteristic" refers to a characteristic or attribute of a listener of digital audio (e.g., spatial audio) that affects how the listener receives, hears, or interprets the digital audio. In some cases, an aural characteristic includes a static characteristic that is personal to the listener, such as a dimension of the listener's head (e.g., the diameter of the head or the distance between ears). In some implementations, an aural characteristic includes a dynamic characteristic, such as an orientation of the listener's head or a distance between the listener and an audio device). In some cases, an aural characteristic includes a model or function that characterizes how the listener receives, hears, or interprets digital audio (e.g., a head-related transfer function or an interaural time difference model).

Additionally, as used herein, the term "audio signal" refers to a digital signal that transmits digital audio. In particular, an audio signal can refer to a digital signal that carries digital audio from an origin location (e.g., a speaker/transducer) to a receiving location (e.g., the ear of a listener or a microphone). To illustrate, in some cases, an audio signal refers to a digital signal that transmits spatial audio.

Further, as used herein, the term "audio time delay" refers to a delay applied to audio to modify playback of digital audio in the time domain. For example, in some cases, the spatial audio extension system applies an audio time delay to a portion of audio that is produced at a location proximate to a target reception point (e.g., the ears of a listener) to time align the portion of audio with a corresponding portion of audio that is produced at a location farther away from the target reception point.

Additional detail regarding the spatial audio extension system will now be provided with reference to the figures. For example, FIG. 1 illustrates a diagram of an exemplary system environment ("environment") 100 in which a spatial audio extension system 106 operates. As shown in FIG. 1, the environment includes a wearable audio device 102, a network 108, an external audio device 110, and a third-party audio platform 114.

Although the environment 100 of FIG. 1 is depicted as having a particular number of components, the environment 100 is capable of having any number of additional or alternative components (e.g., any number of wearable audio devices, external audio devices, third-party audio platforms, or other components in communication with the spatial audio extension system 106). Similarly, although FIG. 1 illustrates a particular arrangement of the wearable audio device 102, the network 108, the external audio device 110, and the third-party audio platform 114, various additional arrangements are possible.

The wearable audio device 102, the network 108, the external audio device 110, and the third-party audio platform 114 can be communicatively coupled with each other either directly or indirectly (e.g., through the network 108 discussed in greater detail below in relation to FIG. 7). Indeed, as shown in FIG. 1, the wearable audio device 102 and the external audio device 110 communicate via a direct connection (e.g., a Bluetooth connection) in some instances. Moreover, the wearable audio device 102, the external audio device 110, and the third-party audio platform 114 can include one of a variety of computing devices (including one or more computing devices as discussed in greater detail with relation to FIG. 7). To illustrtae, in some implementations, the third-party audio platform 114 includes a third-party system hosted on one or more computing devices, such as one or more servers.

In one or more embodiments, the wearable audio device 102 includes a device that is capable of playing digital audio, such as spatial audio. For example, the wearable audio device 102 can include, or be incorporated into, a head-mounted device, a pair of glasses, a headband, or some other accessory that can be worn on the head or neck area. In some embodiments, the wearable audio device 102 includes a device that is wearable on another part of the body, such as a device that can be worn on the arm or wrist (e.g., a smart watch, a fitness watch, an armband, etc.). In some embodiments, the wearable audio device 102 includes an augmented reality device or a virtual reality device (e.g., a head-mounted augmented reality device or head-mounted virtual reality device). As shown, the wearable audio device 102 includes speaker(s) 104 for playing digital audio, such as spatial audio. In some embodiments, the speaker(s) 104 are integrated into some portion of the wearable audio device 102. The wearable audio device 102 can include various numbers and arrangements of speakers in different embodiments.

In one or more embodiments, the external audio device 110 also includes a device that is capable of playing digital audio. In particular, the external audio device 110 can refer to an audio device that is external to the wearable audio device 102 and capable of playing digital audio. Indeed, as shown in FIG. 1, the external audio device 110 includes speaker(s) 112 for playing digital audio. The speaker(s) 112 are, therefore, also external to the wearable audio device 102. As an example, the external audio device 110 can include a portable audio device (e.g., smartphone, laptop computer, or one of various other portable devices having speakers that can play digital audio). In some cases, the external audio device 110 includes a stationary audio device (e.g., a television set, a desktop computer, or one of various other stationary devices having speakers that can play digital audio).

As further shown in FIG. 1, the external audio device 110 can implement the spatial audio extension system 106. Indeed, the spatial audio extension system 106 can, via the external audio device 110, generate spatial audio for presentation to a user of the wearable audio device 102. Further, the spatial audio extension system 106 can provide a high-frequency component of the spatial audio for presentation via the speaker(s) 104 of the wearable audio device 102 and a low-frequency component of the spatial audio for presentation via the speaker(s) 112 of the external audio device 110. Thus, the spatial audio extension system 106 can utilize speakers that are external to the wearable audio device 102 (e.g., the speaker(s) 112) for low-frequency audio playback.

In some embodiments, the third-party audio platform 114 includes a hardware/software platform that provides access to digital audio. For example, the third-party audio platform 114 can include a third-party audio system hosted on one or more servers that provides access to digital audio. To illustrate, the third-party audio platform 114 can include an audio streaming service. Thus, in some implementations, the spatial audio extension system 106 can access the third-party audio platform 114 via the network 108, retrieve digital audio stored/maintained by the third-party audio platform 114, and provide the digital audio for presentation to the user of the wearable audio device 102.

The spatial audio extension system 106 can be implemented in whole, or in part, by the individual elements of the environment 100. Indeed, different components of the spatial audio extension system 106 can be implemented by a variety of devices within the environment 100. For example, as indicated by FIG. 1, in one or more implementations, one or more (or all) components of the spatial audio extension system 106 are implemented by a different audio device (e.g., the wearable audio device 102) or a separate audio device than the external audio device 110.

To provide an example, in some cases, the spatial audio extension system 106 operating on the wearable audio device 102 determines an interaural time difference model for the user of the wearable audio device 102. The spatial audio extension system 106 on the wearable audio device 102 provides the interaural time difference model to the spatial audio extension system 106 operating on the external audio device 110. The spatial audio extension system 106 operating on the external audio device 110 determines head-related transfer functions for the user of the wearable audio device 102 and uses the head-related transfer functions and interaural time difference model to render spatial audio at the external audio device 110. The spatial audio extension system 106 operating at the external audio device 110 further provides a low-frequency component of the spatial audio for presentation via the external audio device 110 and provides a high-frequency component for presentation via the wearable audio device 102.

Figure 2:
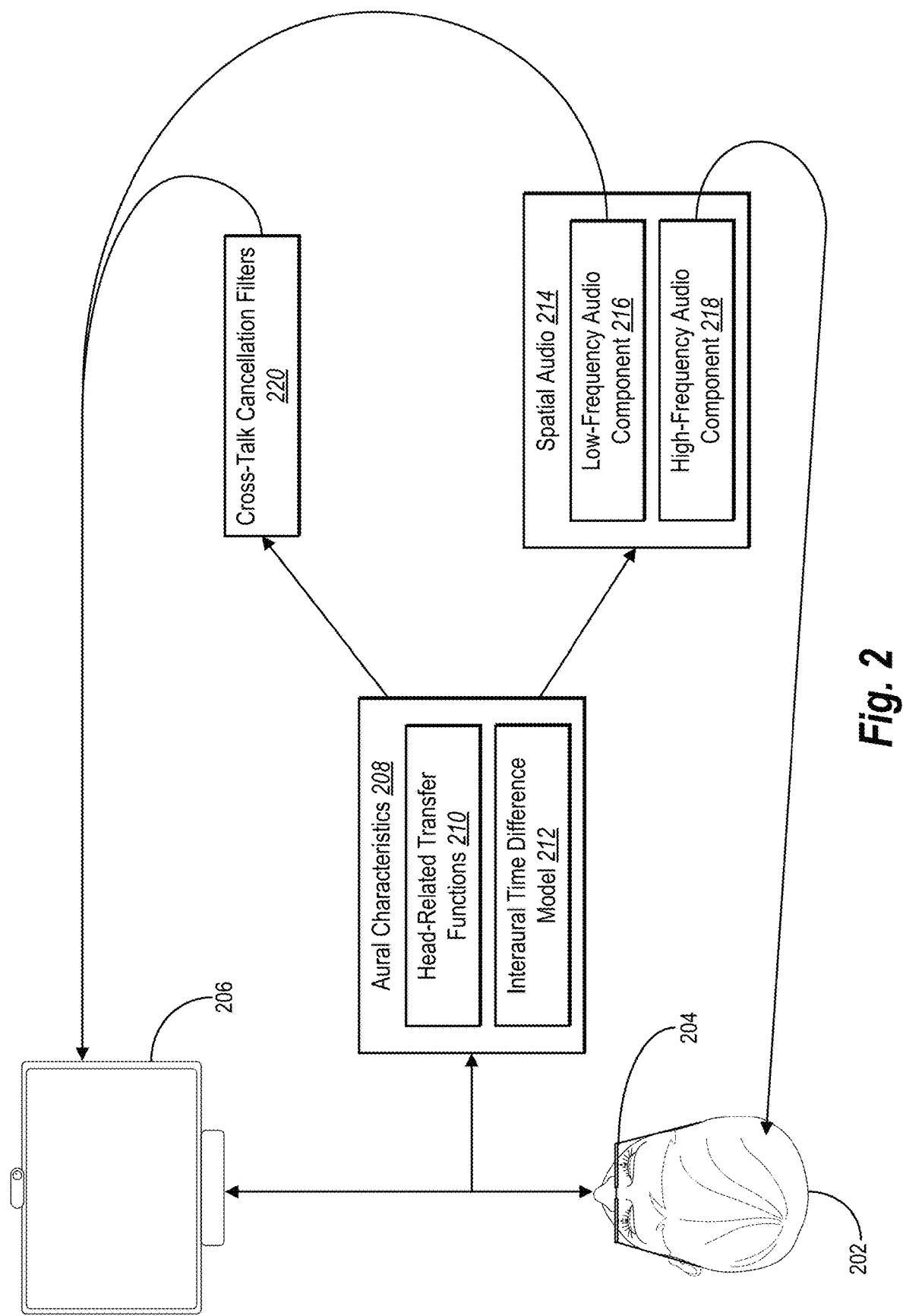
FIG. 2 illustrates an overview diagram of the spatial audio extension system generating and providing spatial audio for presentation to a user of a wearable audio device in accordance with one or more embodiments.

FIG. 2 illustrates an overview diagram of the spatial audio extension system 106 generating and providing spatial audio for presentation to a user of a wearable audio device in accordance with one or more embodiments.

As shown in FIG. 2, the spatial audio extension system 106 determines aural characteristics 208 associated with the user 202 of the wearable audio device 204. In some embodiments, the spatial audio extension system 106 determines the aural characteristics 208 at the external audio device 206. For example, in some cases, the spatial audio extension system 106 operates at the external audio device 206 and determines the aural characteristics 208 based on observations made regarding the user 202 of the wearable audio device 204. In some cases, the spatial audio extension system 106 determines the aural characteristics 208 based on data received from the wearable audio device 204 (or receives the aural characteristics 208 directly).

As shown in FIG. 2, the aural characteristics 208 include head-related transfer functions 210 and an interaural time difference model 212 corresponding to the user 202 of the wearable audio device 204. Determining the interaural time difference model 212 will be discussed in more detail with reference to FIGS. 3A-3B. Determining the head-related transfer functions 210 will be discussed in more detail with reference to FIG. 4.

As further shown in FIG. 2, the spatial audio extension system 106 utilizes the aural characteristics 208 to generate spatial audio 214 for presentation to the user 202 of the wearable audio device 204. As illustrated, the spatial audio 214 includes a low-frequency audio component 216 and a high-frequency audio component 218.

Additionally, as shown in FIG. 2, the spatial audio extension system 106 utilizes the aural characteristics 208 to generate cross-talk cancellation filters 220. In particular, the spatial audio extension system 106 generates the cross-talk cancellation filters for the low-frequency audio component 216 of the spatial audio 214.

Though FIG. 2 illustrates generating the spatial audio 214 and the cross-talk cancellation filters 220 using both the head-related transfer functions 210 and the interaural time difference model 212, it should be understood that the spatial audio extension system 106 can generate the spatial audio 214 or the cross-talk cancellation filters 220 using either of the aural characteristics 208 and/or using aural characteristics not shown in some implementations.

As further shown by FIG. 2, the spatial audio extension system 106 provides the high-frequency audio component 218 of the spatial audio 214 for presentation via the wearable audio device 204 (e.g., the speakers of the wearable audio device 204.) Additionally, the spatial audio extension system 106 provides the low-frequency audio component 216 of the spatial audio 214 for presentation via the external audio device 206 (e.g., the speakers of the external audio device 206). The spatial audio extension system 106 also provides the cross-talk cancellation filters 220 along with the low-frequency audio component 216 of the spatial audio 214. In other words, the spatial audio extension system 106 utilizes the cross-talk cancellation filters 220 to present the low-frequency audio component 216 of the spatial audio 214 via the external audio device 206. For example, in some cases, the spatial audio extension system 106 processes the low-frequency audio component 216 using a cross-over network corresponding to the cross-talk cancellation filters 220 before the low-frequency audio component 216 is played over the speakers of the external audio device 206.

Figure 3A:
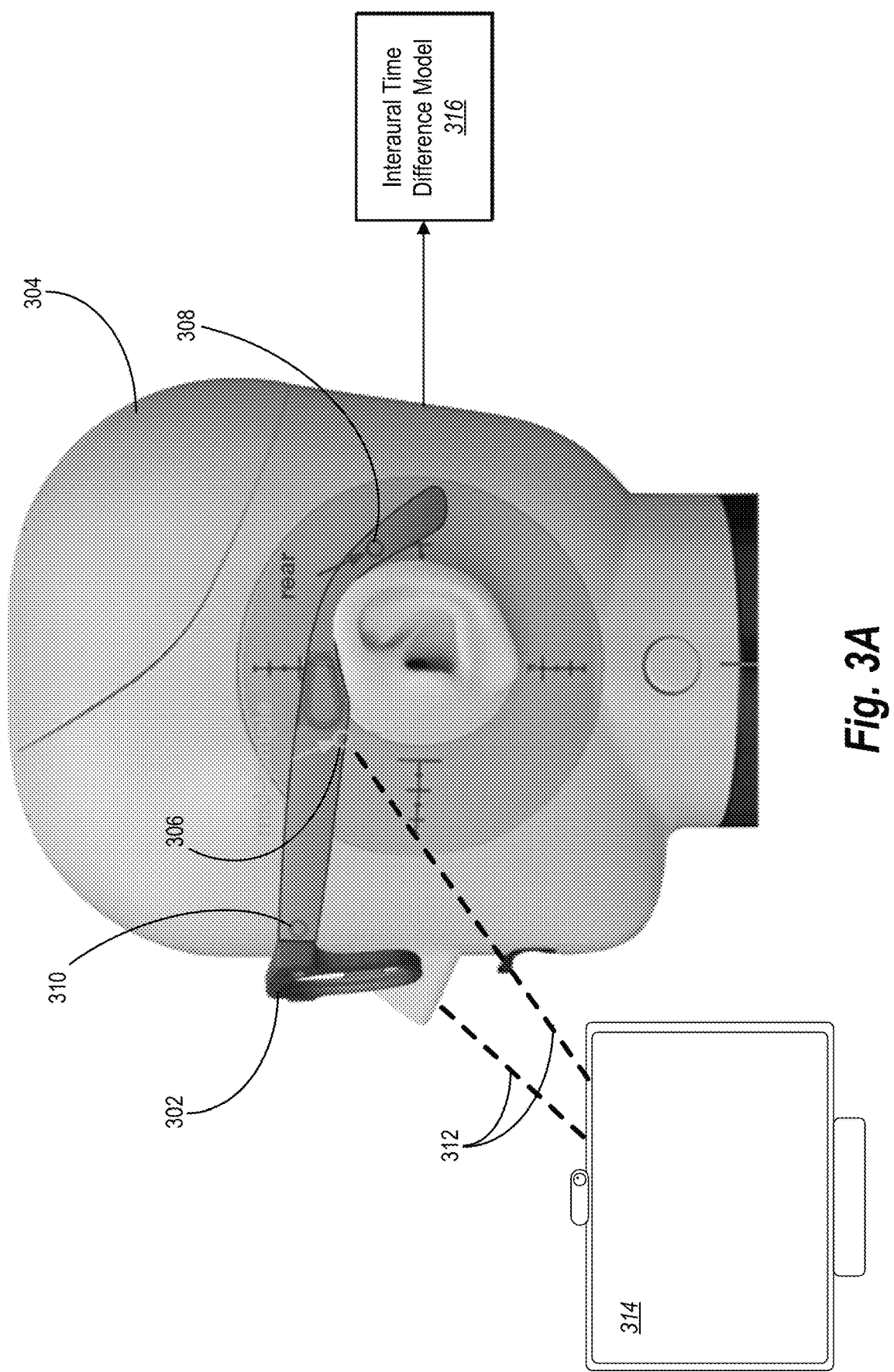
FIG. 3A illustrates determining an interaural time difference model for a user in accordance with one or more embodiments.

FIG. 3A illustrates determining an interaural time difference model for a user 304 in accordance with one or more embodiments. As shown in FIG. 3A, a wearable audio device 302 includes a pair of glasses (e.g., augmented reality glasses or virtual reality glasses), but it should be understood that the spatial audio extension system 106 can utilize various other wearable audio devices in different embodiments.

As shown in FIG. 3A, the wearable audio device 302 includes a microphone 306 positioned near the mid-temple area of the user 304 (e.g., on the armband just in front of the ear). The wearable audio device 302 also includes a microphone 308 positioned at the rear (e.g., on the armband behind the ear). Further, the wearable audio device 302 includes a microphone 310 positioned near the front (e.g., in the area where the armband meets the lens frames).

Though not shown in FIG. 3A, the wearable audio device 302 also includes corresponding microphones positioned on the other side of the user (e.g., positioned similarly on the other armband). Thus, the wearable audio device 302 includes a mid-temple left-right microphone pair, a rear left-right microphone pair, and a front left-right microphone pair. The wearable audio device 302 can include additional or fewer microphone pairs in different embodiments.

As further illustrated by FIG. 3A, the spatial audio extension system 106 operating at the wearable audio device 302 receives an audio signal 312 (emitted from an external audio device 314) via the microphone 306 at the mid-temple area, the microphone 308 at the rear, and/or the microphone 310 positioned at the front of the wearable audio device 302. In particular, the spatial audio extension system 106 receives the audio signal 312 at a microphone on one side of the wearable audio device 302 and also receives the audio signal 312 at the corresponding microphone on the other side of the wearable audio device 302.

Using the reception of the audio signal 312, the spatial audio extension system 106 determines the interaural time difference model 316 for the user 304. In particular, the spatial audio extension system 106 can determine the interaural time difference model 316 based on the lapse in time between one or more of the microphones on one side of the wearable audio device 302 receiving the audio signal 312 and the corresponding microphone(s) on the other side of the wearable audio device 302 receiving the audio signal 312.

In one or more embodiments, the spatial audio extension system 106 determines the interaural time difference model 316 further based on the reception of additional audio signals by microphones of the wearable audio device 302. For instance, in some cases, the spatial audio extension system 106 determines the interaural time difference model 316 based on the reception of audio signals originating from various azimuth angles with respect to the user 304 of the wearable audio device 302.

Further, in some cases, the spatial audio extension system 106 determines the interaural time difference model 316 based on a reception of one or more audio signals by a single microphone pair of the wearable audio device 302 (e.g., the mid-temple left-right microphone pair). In some instances, however, the spatial audio extension system 106 determines the interaural time difference model 316 based on reception by multiple microphone pairs. For example, in at least one implementation, the spatial audio extension system 106 determines the interaural time difference model 316 based on reception of one or more audio signals by a combination (e.g., a linear combination) of the mid-temple left-right microphone pair and the rear left-right microphone pair.

Thus, in some embodiments, the spatial audio extension system 106 determines the interaural time difference model 316 at the wearable audio device 302. In some implementations, however, the spatial audio extension system 106 determines the interaural time difference model 316 at the external audio device 314. For example, in some cases, the spatial audio extension system 106 operating on the external audio device 314 receives, from the wearable audio device 302, indications (e.g., timestamps) of when audio signals have been received by the microphones of the wearable audio device 302. The spatial audio extension system 106 can utilize these indications to determine the interaural time difference model 316 for the user 304.

Figure 3B:
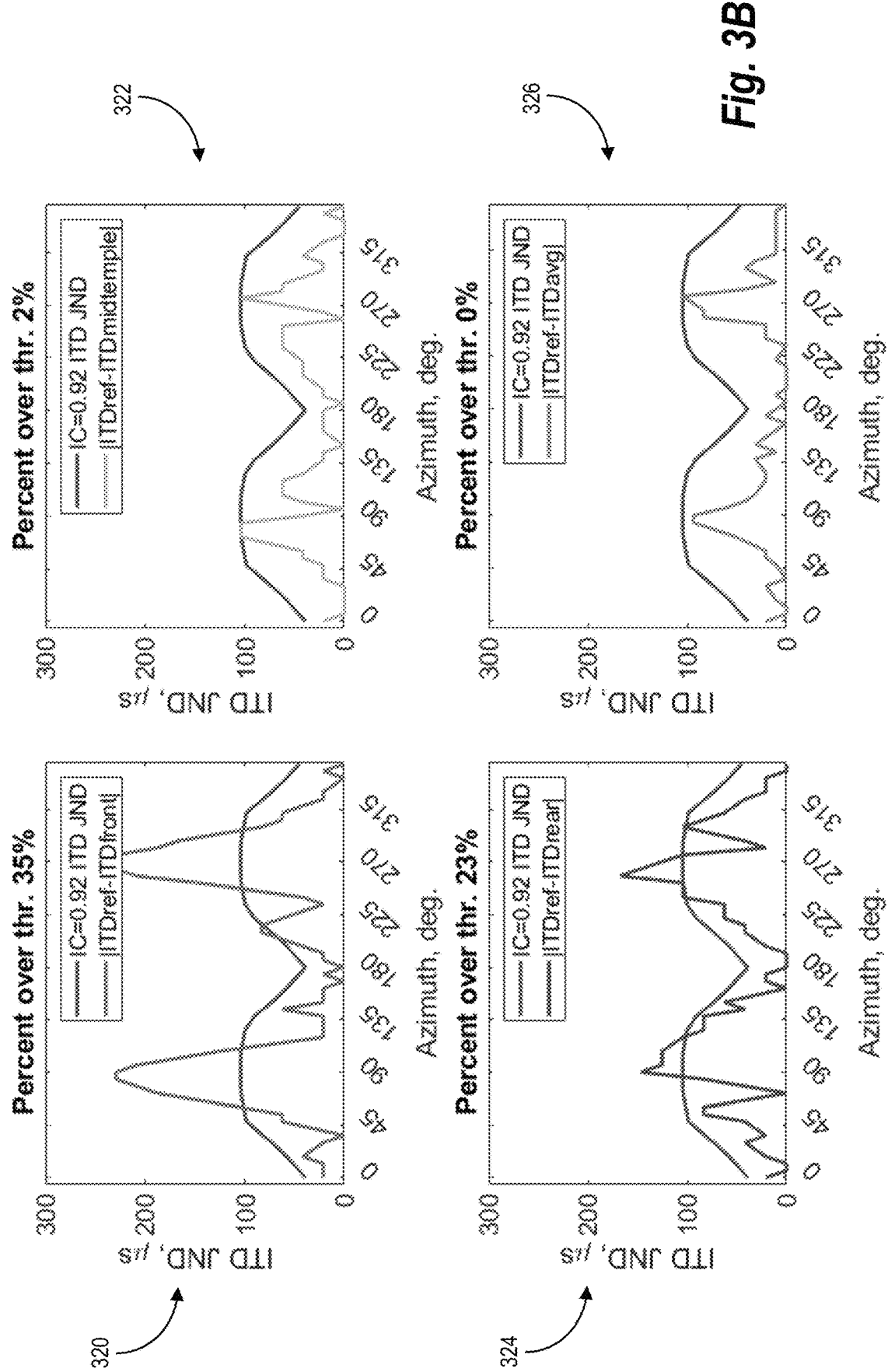
FIG. 3B illustrates graphs reflecting various interaural time difference models determined for a user of a wearable audio device in accordance with one or more embodiments.

FIG. 3B illustrates graphs comparing various interaural time difference models determined for a user of a wearable audio device to a just noticeable difference (JTD) metric derived from a high interaural coherence (IC=0.92) model in accordance with one or more embodiments. In particular, each of the graphs show absolute difference between the interaural time difference determined for the user using the microphones of the wearable audio device and the interaural time difference for the ears of the user (labeled "ITDref").

The graph 320 represents the interaural time difference determined for the user using the front left-right pair of microphones of the wearable audio device. The graph 322 represents the interaural time difference determined for the user using the mid-temple left-right pair of microphones of the wearable audio device. The graph 324 represents the interaural time difference determined for the user using the rear left-right pair of microphones of the wearable audio device. Further, the graph 326 represents the interaural time difference determined for the user using an average (e.g., linear combination) of the interaural time difference determined using the mid-temple left-right pair and rear left-right pair of microphones.

As shown by the graphs of FIG. 3B, the spatial audio extension system 106 can determine a perceptually valid model of a user's interaural time difference using various microphones of the wearable audio device. For instance, the absolute difference plotted in the graph 326 falls well below the plotted JTD line for most azimuth angles. Thus, the graph 326 indicates that the combination of the mid-temple left-right pair and rear left-right pair of microphones approximates the true interaural time difference of the user without a perceptual difference. Accordingly, the spatial audio extension system 106 can utilize such an interaural time difference model of the user to provide spatial audio for that user.

In one or more embodiments, the spatial audio extension system 106 progressively builds the interaural time difference model for a user as additional audio signals are received by the microphones of the wearable audio device. For instance, in some cases, as a new sound is captured by the microphones of the wearable audio device, the spatial audio extension system 106 determines the magnitude coherence between the left and right microphone pairs. The spatial audio extension system 106 further uses high-coherence time-frequency cells to compute new interaural time difference values and updates the interaural time difference model accordingly. In some cases, the spatial audio extension system 106 discards values associated with low-coherence time-frequency cells.

Accordingly, the spatial audio extension system 106 can operate more flexibly than conventional systems. In particular, by building a personalized interaural time difference model for a user, the spatial audio extension system 106 can more flexibly tailor the spatial audio that will be provided for the user.

In some cases, rather than using the reception of audio signals by the microphones of the wearable audio device, the spatial audio extension system 106 determines an interaural time difference model for a user using various other approaches. For example, in some cases, the spatial audio extension system 106 determines an interaural time difference model for a user based on one or more dimensions of the user's head. For instance, in some cases, the spatial audio extension system 106 determines one or more dimensions of the user's head and then employs a spherical head model that matches the dimension(s) to determine the interaural time difference model. In some cases, the spatial audio extension system 106 maintains or accesses a database that maps head dimensions to corresponding interaural time difference models. Thus, the spatial audio extension system 106 can locate the measurement of the user's head within the database and determine the corresponding interaural time difference model using the mapping.

Figure 4:
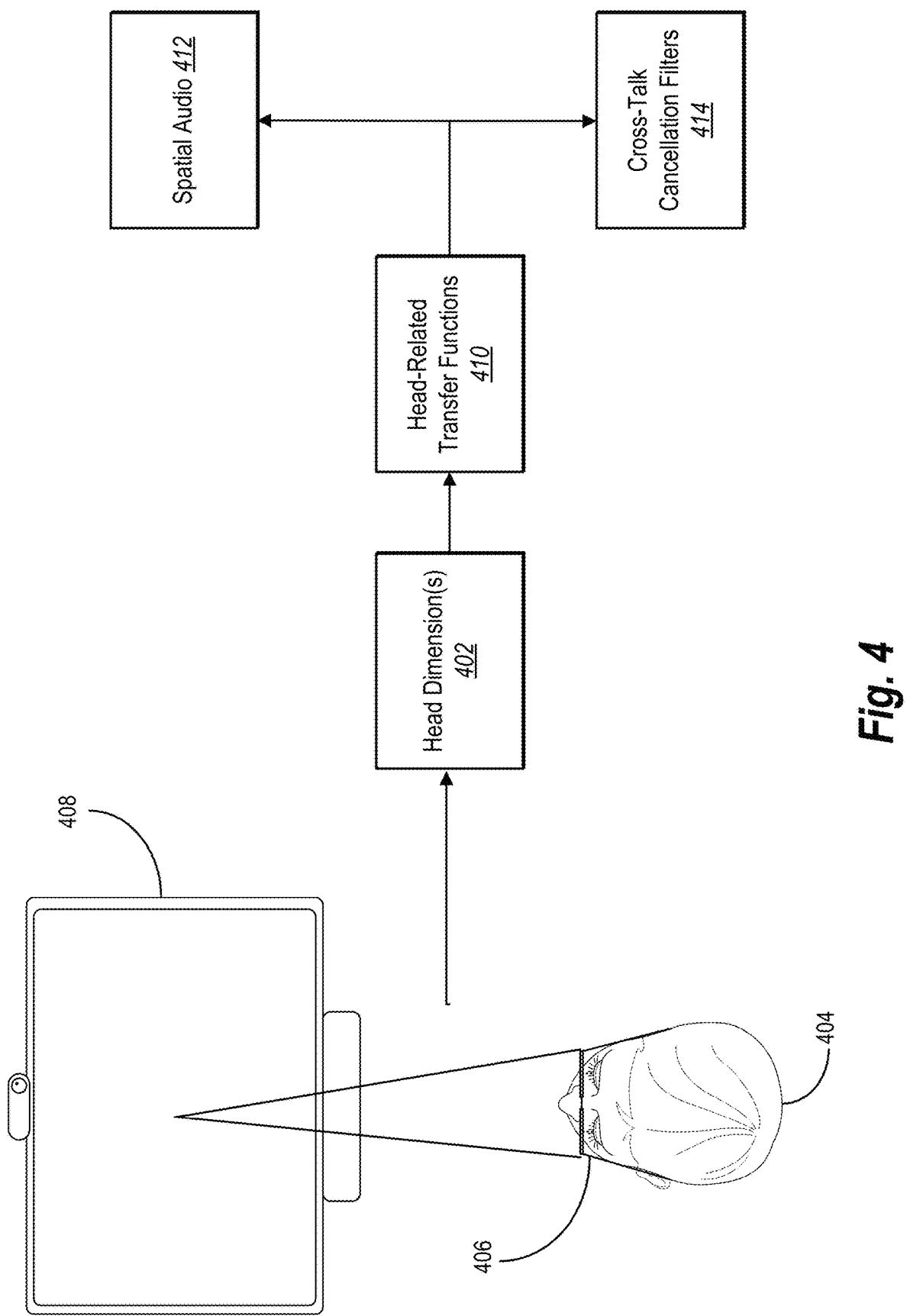
FIG. 4 illustrates using head dimensions to determine head-related transfer functions for a user of a wearable audio device in accordance with one or more embodiments.

FIG. 4 illustrates using head dimensions to determine head-related transfer functions for a user of a wearable audio device in accordance with one or more embodiments.

As shown in FIG. 4, the spatial audio extension system 106 determines a head dimension(s) 402 associated with the user 404 of the wearable audio device 406. For example, in some embodiments, the spatial audio extension system 106 determines a diameter of the head of the user 404 or a distance between the user's ears.

As indicated by FIG. 4, in some cases, the spatial audio extension system 106 utilizes an external audio device 408 to determine the head dimension(s) 402 associated with the user 404. For instance, in some cases, the spatial audio extension system 106 employs a sensor (e.g., a depth sensor) or a camera integrated or connected to the external audio device 408 to determine the head dimension(s) 402 of the user 404.

In some cases, the spatial audio extension system 106 utilizes the external audio device 408 to determine one or more additional metrics associated with the user 404. For example, the spatial audio extension system 106 can utilize the external audio device 408 to determine an orientation of the user's head or to determine a distance between the user 404 and the external audio device 408 (or a distance between the wearable audio device 406 and the external audio device 408).

As further shown in FIG. 4, the spatial audio extension system 106 utilizes the head dimension(s) 402 (and/or the other determined metrics) to determine head-related transfer functions 410 for the user 404 of the wearable audio device 406. To illustrate, in some embodiments, the spatial audio extension system 106 identifies a spherical head model that corresponds to (e.g., best matches) the head dimension(s) 402 determined for the user 404 (and/or the other determined metrics). The spatial audio extension system 106 can utilize the identified spherical head model to determine the head-related transfer functions 410.

In some implementations, the spatial audio extension system 106 accesses a database that maps (a range of) head dimensions to head-related transfer functions. Accordingly, in some embodiments, the spatial audio extension system 106 identifies the head dimension(s) 402 within the database and uses the mapping to identify the corresponding head-related transfer functions. In some cases, the spatial audio extension system 106 utilizes a nearest neighbor approach to determine the best match from the database.

Additionally, as shown in FIG. 4, the spatial audio extension system 106 utilizes the head-related transfer functions 410 to generate spatial audio 412 for presentation to the user 404. In one or embodiments, the spatial audio extension system 106 interpolates the head-related transfer functions 410 to generate the spatial audio 412. For example, in some cases, the spatial audio extension system 106 generates the spatial audio 412 via interpolation of the head-related transfer functions 410 as described by Aditya Srivastava et al., Spatial HRTF Interpolation Using Spectral Phase Constraints, 2020 International Conference on Signal Processing and Communications, 2020 or as described by Fabio P. Freeland, Efficient HRTF Interpolation in 3D Moving Sound, $22^{nd}$ International AES Conference, 2002, both of which are incorporated herein by reference in their entirety.

Further, as shown in FIG. 4, the spatial audio extension system 106 generates cross-talk cancellation filters 414. In some cases, to generate the cross-talk cancellation filters 414, the spatial audio extension system 106 utilizes the spherical head model that corresponds to the user 404. Indeed, in some cases, the spherical head model provides the cross-talk cancellation filters that are suited for the head dimensions/head-related transfer functions determined for the user.

In some embodiments, the spatial audio extension system 106 generates the cross-talk cancellation filters 414 as described by Piortr Majdak et al., *Sound Localization in Individualized and Non-individualized Crosstalk Cancellation Systems*, The Journal of the Acoustical Society of America, 2013 or as described by Ole Kirkeby et al., *Design of Cross-talk Cancellation Networks by Using Fast Deconvolution*, Audio Engineering Society, 1999, both of which are incorporated herein by reference in their entirety.

In some cases, the spatial audio extension system 106 also uses the interaural time difference model determined for the user 404 to generate the spatial audio 412 and/or the cross-talk cancellation filters 414.

Further, in some embodiments, the spatial audio extension system 106 updates the cross-talk cancellation filters 414 in real time. For example, the spatial audio extension system 106 can determine a change to the head dimensions of the user of the wearable audio device 406 (e.g., based on a new user wearing the wearable audio device 406), a change to the orientation of the user's head, and/or a change in the distance between the wearable audio device 406 and the external audio device 408. Accordingly, the spatial audio extension system 106 can update the cross-talk cancellation filters 414 based on the determined changes.

In some embodiments, the spatial audio extension system 106 updates the cross-talk cancellation filters 414 based on the spatial audio quality produced by the external audio device 408 (e.g., a quality metric that indicates the quality of the low-frequency component emitted by the speakers of the external audio device 408). As an example, in some implementations, the spatial audio extension system 106 utilizes one or more microphone pairs of the wearable audio device 406 (e.g., the microphone pair that is closest to the ears of the user 404, such as the microphone pair including the microphone 306 positioned near the mid-temple area as discussed with reference to FIG. 3A) to capture the spatial audio produced by the external audio device 408. The spatial audio extension system 106 can utilize the captured audio to determine the interaural time difference that corresponds to the audio reproduced by the cross-talk cancellation network of the external audio device 408. The spatial audio extension system 106 can compare the determined interaural time difference to the expected interaural time difference (e.g., the interaural time difference determined as discussed with reference to FIG. 3A). Based on the comparison (e.g., based on any deviation from the expected interaural time difference determined from the comparison), the spatial audio extension system 106 can modify the cross-talk cancellation filters 414. For example, the spatial audio extension system 106 can modify the cross-talk cancellation filters 414 to reduce the deviation between the interaural time difference of the spatial audio emitted from the external audio device 408 and the expected interaural time difference.

Accordingly, as previously discussed, the spatial audio extension system 106 can provide a high-frequency audio component of the spatial audio 412 for presentation via the wearable audio device 406. Further, the spatial audio extension system 106 can provide a low-frequency audio component of the spatial audio 412 for presentation via the external audio device 408 using the cross-talk cancellation filters 414. For example, the spatial audio extension system 106 operating on the external audio device 408 can transmit the high-frequency audio component of the spatial audio 412 to the wearable audio device 406 and provide the low-frequency audio component to the transducers/speakers of the external audio device 408 using the cross-talk cancellation filters 414.

By providing spatial audio in this manner, the spatial audio extension system 106 can operate more accurately than many conventional systems. For example, by utilizing an external audio device to provide low-frequency audio playback, the spatial audio extension system 106 leverages the increased power of larger speakers to provide improved low-frequency audio. Thus, the spatial audio extension system 106 can provide more accurate spatial cues via the low-frequency playback.

Further, the spatial audio extension system 106 is more flexible than many conventional systems. Indeed, by leveraging an external audio device, the spatial audio extension system 106 can more flexibly incorporate wearable audio devices into spatial audio presentations. In particular, the spatial audio extension system 106 circumvents the poor quality low-frequency playback that is inherent to wearable audio devices by utilizing the relatively more powerful speakers of an external device. Thus, the spatial audio extension system 106 can flexibly incorporate wearable audio devices into spatial audio presentations by having the wearable audio devices focus on playback of high frequencies.

Figure 5:
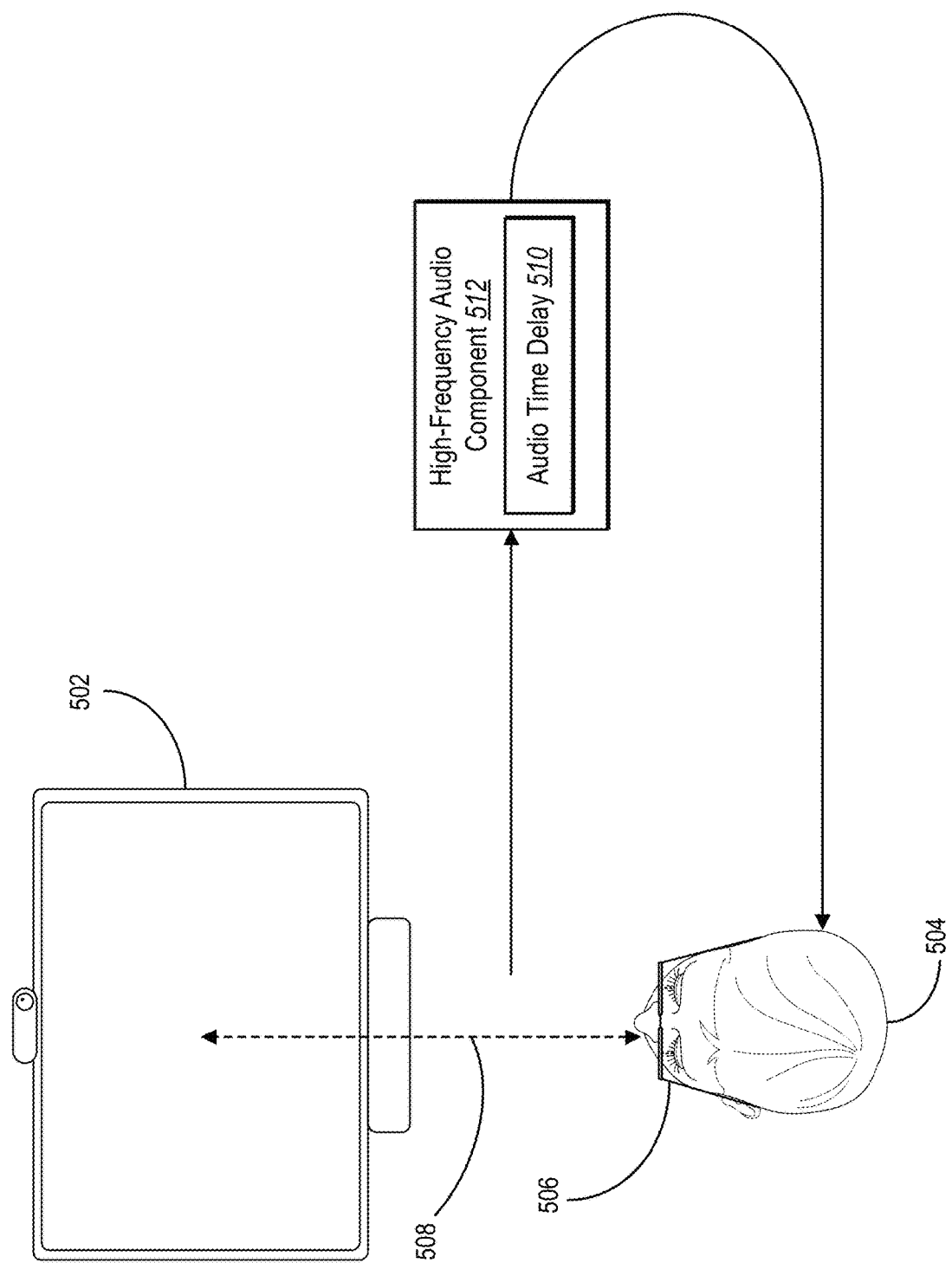
FIG. 5 illustrates using an audio time delay to time align components of spatial audio at the ear of a user in accordance with one or more embodiments.

FIG. 5 illustrates using an audio time delay to time align components of spatial audio at the ear of a user in accordance with one or more embodiments.

Indeed, as the wearable audio device is worn by the user, the external audio device farther away from the user than the wearable audio device in some embodiments. In particular, the external audio device is farther from the point of sound reception (e.g., the ears of the user), causing the sound emitted by the external audio device to travel a farther distance. Accordingly, in one or more embodiments, the spatial audio extension system 106 utilizes an audio time delay to time-delay the audio signal emitted by the external audio device and the audio signal emitted by the wearable audio device by the time the audio signals reach the user's ears.

As illustrated in FIG. 5, the spatial audio extension system 106 can determine a distance 508 between an external audio device 502 and a user 504 of a wearable audio device 506 (e.g., the distance between the external audio device 502 and the wearable audio device 506 itself). For example, the spatial audio extension system 106 can utilize a camera or sensor of the wearable audio device 506 to determine the distance 508.

The spatial audio extension system 106 can determine an audio time delay 510 based on the distance 508. In particular, the spatial audio extension system 106 determines the audio time delay 510 for a high-frequency audio component 512 of spatial audio to be presented to the user 504. To illustrate, the spatial audio extension system 106 can determine a time that an audio signal emitted from the wearable audio device 506 will take to travel the distance to the user 504. Accordingly, the spatial audio extension system 106 can determine an audio time delay that will delay the high-frequency audio component 512 by the same amount of time. As indicated by FIG. 5, the spatial audio extension system 106 can provide the high-frequency audio component 512 for presentation to the user 504 via the wearable audio device 506 along with the audio time delay 510. The spatial audio extension system 106 at the wearable audio device 506 can apply the audio time delay 510 to the high-frequency audio component 512, allowing an audio signal from the high-frequency audio component 512 to reach the ears of the user 504 at the same time as a corresponding audio signal emitted by the external audio device 502.

In some cases, the spatial audio extension system 106 generates the spatial audio to be presented to the user 504 at the wearable audio device 506. Accordingly, the spatial audio extension system 106 can determine an additional time delay corresponding to the time it takes to transmit the low-frequency audio component of the spatial audio to the wearable audio device 506. The spatial audio extension system 106 can apply this additional audio time delay to the high-frequency audio component 512 to further time align the audio signals.

In some cases, the spatial audio extension system 106 synchronizes the low-frequency audio component emitted from the external audio device 502 and the high-frequency audio component emitted from the wearable audio device 506 using further audio processing. To illustrate, in some cases, the spatial audio extension system 106 takes measurements of the speakers of the external audio device 502 and the wearable audio device 506 (e.g., transform function, impulse response, linearity), defines a cross-over setting based on the measurements, time aligns the audio outputs of each device, and equalizes the magnitude and phase of the audio outputs. Indeed, in some embodiments, the spatial audio extension system 106 synchronizes the low-frequency and high-frequency audio components as described by U.S. Pat. App. No. 63/046,947 filed on Jul. 1, 2020, entitled GENERATING SYNCHRONIZED AUDIO PLAYBACK FOR SPEAKER SYSTEMS INTEGRATED WITH GLASSES DEVICES, the contents of which are expressly incorporated herein by reference in their entirety.

Figure 6:
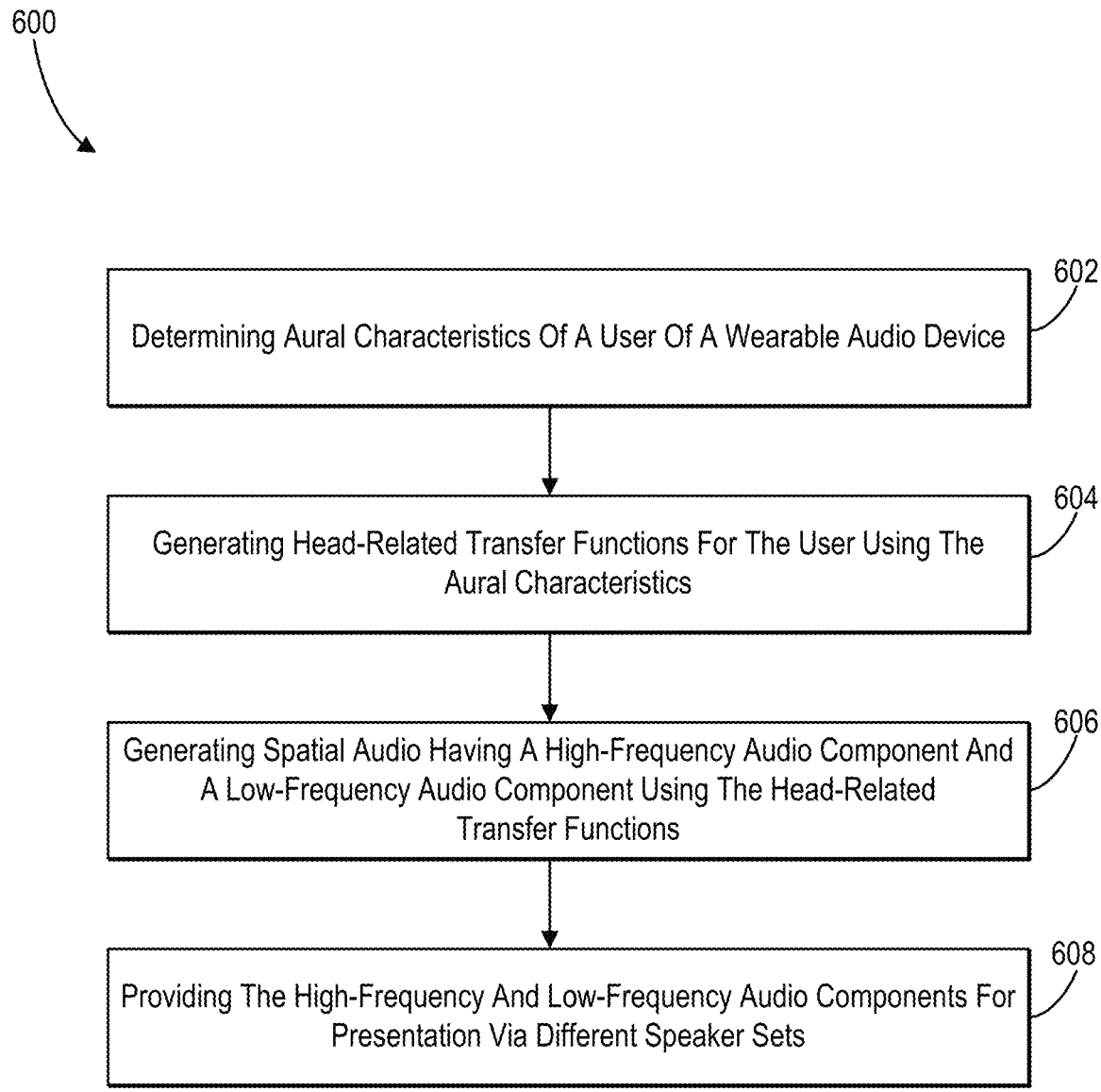
FIG. 6 illustrates a flowchart of a series of acts for providing spatial audio to a user of a wearable audio device in accordance with one or more embodiments.

FIGS. 1-5, the corresponding text, and the examples provide a number of different methods, systems, devices, and non-transitory computer-readable media of the spatial audio extension system 106. In addition to the foregoing, one or more embodiments can also be described in terms of flowcharts comprising acts for accomplishing the particular result, as shown in FIG. 6. FIG. 6 may be performed with more or fewer acts. Further, the acts may be performed in different orders. Additionally, the acts described herein may be repeated or performed in parallel with one another or in parallel with different instances of the same or similar acts.

FIG. 6 illustrates a flowchart of a series of acts 600 for providing spatial audio to a user of a wearable audio device in accordance with one or more embodiments. While FIG. 6 illustrates acts according to one embodiment, alternative embodiments may omit, add to, reorder, and/or modify any of the acts shown in FIG. 6. In some implementations, the acts of FIG. 6 are performed as part of a computer-implemented method. Alternatively, a non-transitory computer-readable medium can store instructions thereon that, when executed by at least one processor, cause a computing device to perform the acts of FIG. 6. In some embodiments, a system performs the acts of FIG. 6. For example, in one or more embodiments, a system includes at least one processor and at least one non-transitory computer-readable medium storing instructions that, when executed by the at least one processor, cause the system to perform the acts of FIG. 6.

The series of acts 600 includes an act 602 of determining aural characteristics of a user of a wearable audio device. For instance, in some cases, the act 602 involves determining one or more aural characteristics associated with a user of a wearable audio device (e.g., a pair of virtual reality or augmented reality glasses).

In one or more embodiments, determining the one or more aural characteristics associated with the user of the wearable audio device comprises determining one or more dimensions corresponding to a head of the user of the wearable audio device.

The series of acts 600 also includes an act 604 of generating head-related transfer functions for the user using the aural characteristics. For instance, in some embodiments, the act 604 involves generating a pair of head-related transfer functions for the user of the wearable audio device using the one or more aural characteristics.

In some embodiments, generating the pair of head-related transfer functions for the user of the wearable audio device using the one or more aural characteristics comprises generating the pair of head-related transfer functions using a spherical head model that corresponds to the one or more aural characteristics associated with the user of the wearable audio device. In some cases, generating the pair of head-related transfer functions for the user of the wearable audio device using the one or more aural characteristics comprises determining the pair of head-related transfer functions using the one or more dimensions corresponding to the head of the user. Accordingly, the spatial audio extension system 106 can determine a spherical head model that corresponds to the one or more dimensions of the user's head.

Additionally, the series of acts 600 includes an act 606 of generating spatial audio having a high-frequency audio component and a low-frequency audio component using the head-related transfer functions. To illustrate, in some instances, the act 606 involves generating spatial audio using the pair of head-related transfer functions, the spatial audio comprising a high-frequency audio component having audio that meets or exceeds a frequency threshold and a low-frequency audio component having audio that is below the frequency threshold.

In one or more embodiments, the spatial audio extension system 106 further identifies an interaural time difference model for the user of the wearable audio device corresponding to reception of one or more audio signals by a microphone array of the wearable audio device. Accordingly, in some cases, the spatial audio extension system 106 generates the spatial audio using the pair of head-related transfer functions comprises generating the spatial audio using the pair of head-related transfer functions and the interaural time difference model. In some cases, identifying the interaural time difference model for the user of the wearable audio device corresponding to the reception of the one or more audio signals by the microphone array of the wearable audio device comprises identifying the interaural time difference model corresponding to the reception of the one or more audio signals by least one of a mid-temple left-right microphone pair of the wearable audio device or a rear left-right microphone pair of the wearable audio device.

The series of acts 600 further includes an act 608 of providing the high- and low-frequency audio components for presentation via different speaker sets. For example, in one or more embodiments, the act 608 involves providing the high-frequency audio component of the spatial audio for presentation via speakers of the wearable audio device and the low-frequency audio component of the spatial audio for presentation via speakers external to the wearable audio device.

In some cases, the spatial audio extension system 106 further determines a pair of cross-talk cancellation filters for the low-frequency audio component of the spatial audio using the pair of head-related transfer functions. Accordingly, the spatial audio extension system 106 can provide the low-frequency audio component of the spatial audio for presentation via the speakers external to the wearable audio device by providing the low-frequency audio component of the spatial audio for presentation via the speakers external to the wearable audio device using the cross-talk cancellation filters. In some instances, the spatial audio extension system 106 can further determine a change to at least one aural characteristic of the one or more aural characteristics associated with the user of the wearable audio device; update the cross-talk cancellation filters for the low-frequency audio component of the spatial audio using the change to the at least one aural characteristic; and provide the low-frequency audio component of the spatial audio for presentation via the speakers external to the wearable audio device using the updated cross-talk cancellation filters. In some embodiments, the spatial audio extension system 106 determines a quality metric corresponding to the low-frequency audio component of the spatial audio presented via the speakers external to the wearable audio device; updates the cross-talk cancellation filters for the low-frequency audio component of the spatial audio based on the quality metric corresponding to the low-frequency audio component; and provides the low-frequency audio component of the spatial audio for presentation via the speakers external to the wearable audio device using the updated cross-talk cancellation filters. For example, in some cases, the spatial audio extension system 106 determines the quality metric by determining a deviation of an interaural time difference corresponding the low-frequency audio component from an expected interaural time difference.

In one or more embodiments, the spatial audio extension system 106 further determines a distance between the wearable audio device and the speakers external to the wearable audio device; and determines an audio time delay to time align, at ears of the user of the wearable audio device, the high-frequency audio component of the spatial audio presented via the speakers of the wearable audio device and the low-frequency audio component of the spatial audio presented via the speakers external to the wearable audio device using the distance between the wearable audio device and the speakers external to the wearable audio device. Accordingly, the spatial audio extension system 106 can provide the high-frequency audio component of the spatial audio for presentation via the speakers of the wearable audio device by providing the high-frequency audio component for presentation using the audio time delay.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
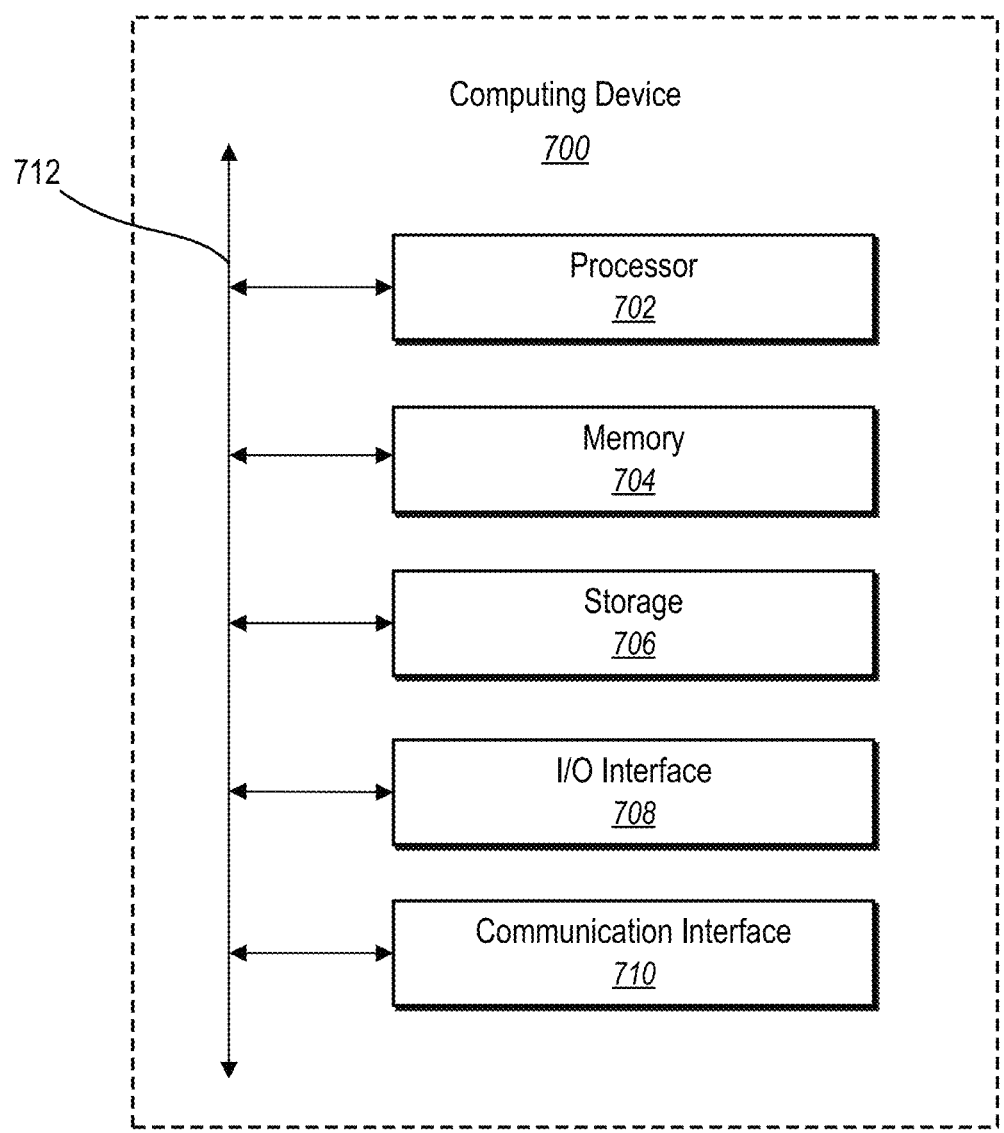
FIG. 7 illustrates a block diagram of an exemplary computing device in accordance with one or more embodiments.

FIG. 7 illustrates a block diagram of an example computing device 700 that may be configured to perform one or more of the processes described above. One will appreciate that one or more computing devices, such as the computing device 700 may represent the computing devices described above (e.g., the wearable audio device 102, the external audio device 110, and/or the third-party audio platform 114). In one or more embodiments, the computing device 700 may be a mobile device (e.g., a mobile telephone, a smartphone, a PDA, a tablet, a laptop, a camera, a tracker, a watch, a wearable device). In some embodiments, the computing device 700 may be a non-mobile device (e.g., a desktop computer or another type of client device). Further, the computing device 700 may be a server device that includes cloud-based processing and storage capabilities.

As shown in FIG. 7, the computing device 700 can include one or more processor(s) 702, memory 704, a storage device 706, input/output interfaces 708 (or "I/O interfaces 708"), and a communication interface 710, which may be communicatively coupled by way of a communication infrastructure (e.g., bus 712). While the computing device 700 is shown in FIG. 7, the components illustrated in FIG. 7 are not intended to be limiting. Additional or alternative components may be used in other embodiments. Furthermore, in certain embodiments, the computing device 700 includes fewer components than those shown in FIG. 7. Components of the computing device 700 shown in FIG. 7 will now be described in additional detail.

In particular embodiments, the processor(s) 702 includes hardware for executing instructions, such as those making up a computer program. As an example, and not by way of limitation, to execute instructions, the processor(s) 702 may retrieve (or fetch) the instructions from an internal register, an internal cache, memory 704, or a storage device 706 and decode and execute them.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 704 may be internal or distributed memory.

The computing device 700 includes a storage device 706 including storage for storing data or instructions. As an example, and not by way of limitation, the storage device 706 can include a non-transitory storage medium described above. The storage device 706 may include a hard disk drive (HDD), flash memory, a Universal Serial Bus (USB) drive or a combination these or other storage devices.

As shown, the computing device 700 includes one or more I/O interfaces 708, which are provided to allow a user to provide input to (such as user strokes), receive output from, and otherwise transfer data to and from the computing device 700. These I/O interfaces 708 may include a mouse, keypad or a keyboard, a touch screen, camera, optical scanner, network interface, modem, other known I/O devices or a combination of such I/O interfaces 708. The touch screen may be activated with a stylus or a finger.

The I/O interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 708 are configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 provides one or more interfaces for communication (such as, for example, packet-based communication) between the computing device and one or more other computing devices or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI. The computing device 700 can further include a bus 712. The bus 712 can include hardware, software, or both that connects components of computing device 700 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

As previously mentioned, embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
    determining one or more aural characteristics associated with a user of a wearable audio device;
    generating a pair of head-related transfer functions for the user of the wearable audio device using the one or more aural characteristics;
    generating spatial audio using the pair of head-related transfer functions, the spatial audio comprising a high-frequency audio component having audio that meets or exceeds a frequency threshold and a low-frequency audio component having audio that is below the frequency threshold;
    determining an audio time delay for the high-frequency audio component based on a distance between the wearable audio device and speakers external to the wearable audio device; and
    providing the low-frequency audio component of the spatial audio for presentation via the speakers external to the wearable audio device and the high-frequency audio component of the spatial audio for presentation via speakers of the wearable audio device using the audio time delay to time align, at ears of the user of the wearable audio device, the high-frequency audio component with the low-frequency audio component.

2. The computer-implemented method of claim 1, further comprising determining a pair of cross-talk cancellation filters for the low-frequency audio component of the spatial audio using the pair of head-related transfer functions,
    wherein providing the low-frequency audio component of the spatial audio for presentation via the speakers external to the wearable audio device comprises providing the low-frequency audio component of the spatial audio for presentation via the speakers external to the wearable audio device using the cross-talk cancellation filters.

3. The computer-implemented method of claim 2, further comprising:
    determining a change to at least one aural characteristic of the one or more aural characteristics associated with the user of the wearable audio device;
    updating the cross-talk cancellation filters for the low-frequency audio component of the spatial audio using the change to the at least one aural characteristic; and
    providing the low-frequency audio component of the spatial audio for presentation via the speakers external to the wearable audio device using the updated cross-talk cancellation filters.

4. The computer-implemented method of claim 1, wherein:
    determining the one or more aural characteristics associated with the user of the wearable audio device comprises determining one or more dimensions corresponding to a head of the user of the wearable audio device; and
    generating the pair of head-related transfer functions for the user of the wearable audio device using the one or more aural characteristics comprises determining the pair of head-related transfer functions using the one or more dimensions corresponding to the head of the user.

5. The computer-implemented method of claim 1, further comprising identifying an interaural time difference model for the user of the wearable audio device corresponding to reception of one or more audio signals by a microphone array of the wearable audio device, wherein generating the spatial audio using the pair of head-related transfer functions comprises generating the spatial audio using the pair of head-related transfer functions and the interaural time difference model.

6. The computer-implemented method of claim 5, wherein identifying the interaural time difference model for the user of the wearable audio device corresponding to the reception of the one or more audio signals by the microphone array of the wearable audio device comprises identifying the interaural time difference model corresponding to the reception of the one or more audio signals by least one of a mid-temple left-right microphone pair of the wearable audio device or a rear left-right microphone pair of the wearable audio device.

7. The computer-implemented method of claim 1, wherein generating the pair of head-related transfer functions for the user of the wearable audio device using the one or more aural characteristics comprises generating the pair of head-related transfer functions using a spherical head model that corresponds to the one or more aural characteristics associated with the user of the wearable audio device.

8. The computer-implemented method of claim 1, further comprising:
determining the distance between the wearable audio device and the speakers external to the wearable audio device using at least one of a camera or a sensor of the wearable audio device.

9. A non-transitory computer-readable medium storing instructions thereon that, when executed by at least one processor, cause a computing device to:
determine one or more aural characteristics associated with a user of a wearable audio device;
generate a pair of head-related transfer functions for the user of the wearable audio device using the one or more aural characteristics;
generate spatial audio using the pair of head-related transfer functions, the spatial audio comprising a high-frequency audio component having audio that meets or exceeds a frequency threshold and a low-frequency audio component having audio that is below the frequency threshold;
determine an audio time delay for the high-frequency audio component based on a distance between the wearable audio device and speakers external to the wearable audio device; and
provide the low-frequency audio component of the spatial audio for presentation via the speakers external to the wearable audio device and the high-frequency audio component of the spatial audio for presentation via speakers of the wearable audio device using the audio time delay to time align, at ears of the user of the wearable audio device, the high-frequency audio component with the low-frequency audio component.

10. The non-transitory computer-readable medium of claim 9,
further comprising instructions that, when executed by the at least one processor, cause the computing device to determine a pair of cross-talk cancellation filters for the low-frequency audio component of the spatial audio using the pair of head-related transfer functions,
wherein the instructions, when executed by the at least one processor, cause the computing device to provide the low-frequency audio component of the spatial audio for presentation via the speakers external to the wearable audio device by providing the low-frequency audio component of the spatial audio for presentation via the speakers external to the wearable audio device using the cross-talk cancellation filters.

11. The non-transitory computer-readable medium of claim 10, further comprising instructions that, when executed by the at least one processor, cause the computing device to:
determine a quality metric corresponding to the low-frequency audio component of the spatial audio presented via the speakers external to the wearable audio device;
update the cross-talk cancellation filters for the low-frequency audio component of the spatial audio based on the quality metric corresponding to the low-frequency audio component; and
provide the low-frequency audio component of the spatial audio for presentation via the speakers external to the wearable audio device using the updated cross-talk cancellation filters.

12. The non-transitory computer-readable medium of claim 9, wherein the instructions, when executed by the at least one processor, cause the computing device to:
determine the one or more aural characteristics associated with the user of the wearable audio device by determining one or more dimensions corresponding to a head of the user of the wearable audio device; and
generate the pair of head-related transfer functions for the user of the wearable audio device using the one or more aural characteristics by determining the pair of head-related transfer functions using the one or more dimensions corresponding to the head of the user.

13. The non-transitory computer-readable medium of claim 9,
further comprising instructions that, when executed by the at least one processor, cause the computing device to identify an interaural time difference model for the user of the wearable audio device corresponding to reception of one or more audio signals by a microphone array of the wearable audio device,
wherein the instructions, when executed by the at least one processor, cause the computing device to generate the spatial audio using the pair of head-related transfer functions by generating the spatial audio using the pair of head-related transfer functions and the interaural time difference model.

14. The non-transitory computer-readable medium of claim 13, wherein the instructions, when executed by the at least one processor, cause the computing device to identify the interaural time difference model for the user of the wearable audio device corresponding to the reception of the one or more audio signals by the microphone array of the wearable audio device by identifying the interaural time difference model corresponding to the reception of the one or more audio signals by least one of a mid-temple left-right microphone pair of the wearable audio device or a rear left-right microphone pair of the wearable audio device.

15. The non-transitory computer-readable medium of claim 9, wherein the instructions, when executed by the at least one processor, cause the computing device to generate the pair of head-related transfer functions for the user of the wearable audio device using the one or more aural characteristics by generating the pair of head-related transfer functions using a spherical head model that corresponds to the one or more aural characteristics associated with the user of the wearable audio device.

16. The non-transitory computer-readable medium of claim 9,
further comprising instructions that, when executed by the at least one processor, cause the computing device to:

determine the distance between the wearable audio device and the speakers external to the wearable audio device using at least one of a camera or a sensor of the wearable audio device.

17. A system comprising:
at least one processor; and
at least one non-transitory computer-readable medium storing instructions thereon that, when executed by the at least one processor, cause the system to:
   determine one or more aural characteristics associated with a user of a wearable audio device;
   generate a pair of head-related transfer functions for the user of the wearable audio device using the one or more aural characteristics;
   generate spatial audio using the pair of head-related transfer functions, the spatial audio comprising a high-frequency audio component having audio that meets or exceeds a frequency threshold and a low-frequency audio component having audio that is below the frequency threshold;
   determine an audio time delay for the high-frequency audio component based on a distance between the wearable audio device and speakers external to the wearable audio device; and
   provide the low-frequency audio component of the spatial audio for presentation via the speakers external to the wearable audio device and the high-frequency audio component of the spatial audio for presentation via speakers of the wearable audio device using the audio time delay to time align, at ears of the user of the wearable audio device, the high-frequency audio component with the low-frequency audio component.

18. The system of claim 17,
further comprising instructions that, when executed by the at least one processor, cause the system to determine a pair of cross-talk cancellation filters for the low-frequency audio component of the spatial audio using the pair of head-related transfer functions,
wherein the instructions, when executed by the at least one processor, cause the system to provide the low-frequency audio component of the spatial audio for presentation via the speakers external to the wearable audio device by providing the low-frequency audio component of the spatial audio for presentation via the speakers external to the wearable audio device using the cross-talk cancellation filters.

19. The system of claim 18, further comprising instructions that, when executed by the at least one processor, cause the system to:
   determine a change to at least one aural characteristic of the one or more aural characteristics associated with the user of the wearable audio device;
   update the cross-talk cancellation filters for the low-frequency audio component of the spatial audio using the change to the at least one aural characteristic; and
   provide the low-frequency audio component of the spatial audio for presentation via the speakers external to the wearable audio device using the updated cross-talk cancellation filters.

20. The system of claim 17, wherein the instructions, when executed by the at least one processor, cause the system to:
   determine the one or more aural characteristics associated with the user of the wearable audio device by determining one or more dimensions corresponding to a head of the user of the wearable audio device; and
   generate the pair of head-related transfer functions for the user of the wearable audio device using the one or more aural characteristics by determining the pair of head-related transfer functions using the one or more dimensions corresponding to the head of the user.

* * * * *